June 3, 1969  C. L. SCHICK  3,447,615
CORE SAMPLE RETRIEVING APPARATUS
Filed March 11, 1966

INVENTOR.
CLIFFORD L. SCHICK
BY
Townsend and Townsend
ATTORNEYS

INVENTOR.
CLIFFORD L. SCHICK
BY
Townsend and Townsend
ATTORNEYS

United States Patent Office 3,447,615
Patented June 3, 1969

3,447,615
CORE SAMPLE RETRIEVING APPARATUS
Clifford L. Schick, 3442 Homestead Road,
Santa Clara, Calif. 95051
Filed Mar. 11, 1966, Ser. No. 533,588
Int. Cl. E21b 49/02
U.S. Cl. 175—17  5 Claims

ABSTRACT OF THE DISCLOSURE

Soil sampling apparatus where a refrigerant fluid is controllably conveyed to the lower end of a tubular casing for retaining the sample as a frozen entity within the tube.

---

This invention relates to a core sampler and more particularly to a core sampler capable of retrieving accurate samples of water-laden or viscous soils.

In analyzing soil to determine such characteristics as bearing strength and the like, a vertically extending core of generally cylindrical cross-section is typically extracted from the soil and transported to a laboratory for test and analysis to discern such characteristics. The accuracy of the analysis and testing is inversely proportional to the degree to which the soil is disturbed in extracting the core. Retrieval of accurate or undisturbed cores from soil containing a large amount of water, as found in swampy regions and regions bordering or submerged beneath a body of water, is difficult or impossible, because such materials are not sufficiently cohesive to be retained in a sample tube against the force of gravity. Mechanical contrivances for closing the lower end of the sample tube after water-laden soil has entered the tube are only partially successful and tend to disturb the soil excessively, thereby producing inaccurate samples.

An object of the present invention is to provide a core sampler that can retrieve soil samples of high water content and low viscosity. This object is accomplished by providing in combination with a soil sample tube of conventional form, a conduit for conveying a refrigerant fluid to the lower end of the sample tube and by applying a refrigerant fluid through the conduit after the sampler is lowered into place to force soil into the tube. On application of the refrigerant fluid, at least the lower portion of the soil sample in the tube is frozen so that the tube and sample therein can be conveniently lifted from the soil without disturbing the soil sample in the tube.

Another object is to provide a core sampler structure that is exceedingly rugged and efficient in its operation. Attainment of this object is effected by providing a hollow casing which is adapted to be driven into the soil by conventional drilling apparatus and which is formed to retain a core sample tube therein. The casing is provided with one or more refrigerant fluid conduits so that when the tube is loaded with a soil sample in response to downward movement of the apparatus, the lower portion of the sample can be quickly frozen to permit ready withdrawal of the entire structure and retrieval of an undisturbed sample.

Still another object of this invention is to provide a method for recovering undisturbed soil samples from even the most viscous or muddy locations. Such method is characterized by the steps of providing a hollow sample tube with an opened lower end, moving the sample tube downward into the soil to fill the tube with soil, and freezing a portion of the soil adjacent the lower opened end of the tube to retain the sample in the tube against the force of gravity.

These and other objects will be more apparent after referring to the following specification and accompanying drawings in which.

Figure 1:
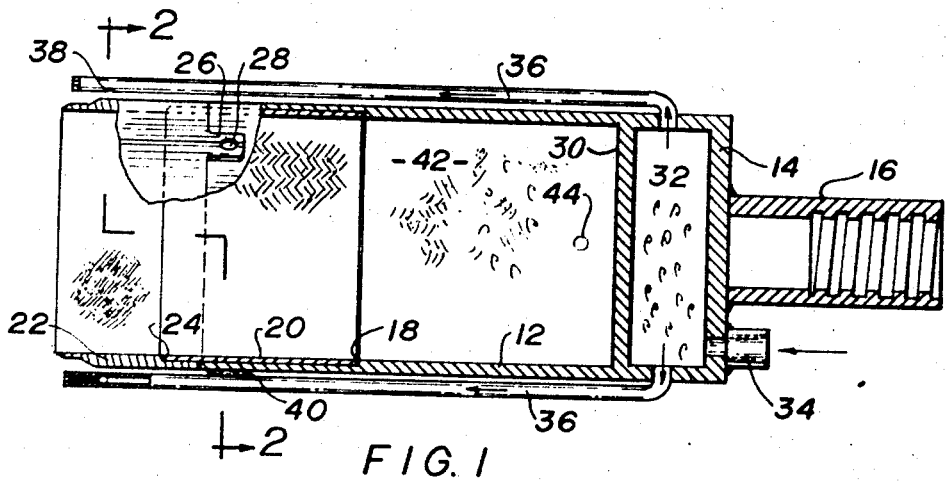
FIG. 1 is a side view in cross section of a core sampler embodying my invention.

Referring more particularly to the drawings, reference numeral 12 indicates a casing of hollow generally cylindrical cross-section having a closed upper end 14 to which is secured a connector 16 that is interiorly threaded to permit mounting of the device on the end of a conventional drill rod. The interior of casing 12 is formed with an enlarged inside diameter wall portion adjacent the lower end thereof which terminates inwardly of the lower end of the casing in a shoulder 18. A cylindrical sample tube 20 has an outer diameter receivable in the enlarged interior of casing 12 and bears against shoulder 18 to limit inward movement of the sample tube in the casing. A cutting bit 22 having outer and inner diameters substantially equal to that of casing 12 is provided for mounting on the lower end of the casing to expedite entry of the sampler into the soil. The cutting bit has an enlarged inside diameter portion adjacent the upper end thereof, which terminates in a shoulder 24 for retaining sample tube 20 in place. Cutting bit 22 can be provided with an upwardly extending tab 26 for attaching the bit to casing 12, the tab being provided with a threaded hole 28 for receiving a set screw or the like.

Spaced from end plate 14 within casing 12 is a wall 30 which defines a manifold chamber 32 in the upper end of casing 12. End plate 14 is provided with a threaded fitting 34 through which communication with the manifold chamber is effected. Extending along the exterior surface of casing 12 are pipes 36 which define conduits for establishing communication from manifold chamber 32 down to a point adjacent the lower end of sample tube 20. Conduits 36 are provided with fluid discharge openings 38 shown here, by way of example, as being disposed opposite cutting bit 22 and adjacent the lower end of sample tube 20. Conduits 36 are firmly secured to the outer surface of casing 12 by any suitable means, for example a weld 40.

As can be seen most clearly in FIG. 1, shoulder 18 is spaced below wall 30; the volume within casing 12 intermediate shoulder 18 and wall 30 functions as a disturbed earth chamber 42. Casing 12 is formed with a vent opening 44 for relieving pressure in chamber 42.

In operation a soil sample is retrieved in accordance with the present invention by first drilling a hole of a depth immediately above the region from which the sample is desired. Such drilling is accomplished in a conventional manner and is not explained in detail for that reason. Suitable well casing pipes can be placed in such hole to prevent the side walls from caving in. When the hole is drilled and the drilling apparatus removed therefrom, the sampler is attached to suitable drill rods by a threaded connection with connector 16, a hose is threadedly joined onto fitting 34, and the apparatus is lowered into the hole. In soft, wet earth for which the present apparatus is particularly effective, the casing can be driven downwardly into the soil at the bottom of the hole with only downward pressure and without rotation. The sharp edge on cutting bit 22 expedites such downward movement. The downward movement is continued until an undisturbed soil sample fills tube 20. Any disturbed earth lying at the bottom of the hole from the drilling operation enters disturbed earth chamber 42 freely since vent 44 permits escape of air from the chamber. A refrigerant fluid is then applied to manifold chamber 32 through a hose connected to fitting 34 and such fluid emanates from jet openings 38. As the fluid issues from the jet openings it expands and cools, thereby freezing the water-laden soil within cutting bit 22 and adjacent the lower end of sample tube 20. When the soil within the cutting bit is frozen solidly, the entire apparatus can be easily lifted, and tube 20 together with its contents can be removed from casing 12 without in any way disturbing the sample contained in it. End enclosures are placed on tube 22 in a conventional way to prepare the sample for transportation to a testing laboratory.

A suitable refrigerant fluid is carbon dioxide ($CO_2$). Carbon dioxide is readily available and is easily storable in a liquid state. When it issues through jet openings 38 it expands and vaporizes, effectively to freeze the soil within cutting bit 22. Although carbon dioxide is preferred because of its ready availability and relatively low cost, any other fluid having the abovementioned characteristics, such as liquid nitrogen, helium, etc., is satisfactory.

In one sampler constructed according to the present invention, casing 12 has an outside diameter of about 2¾ inches and an over-all length, from the top of connector 16 to the cutting edge of cutting bit 22, of about 10½ inches. The sample tube employed in such apparatus has an inside diameter of approximately 2⁷⁄₁₆ inches and a length of approximately 3⅜ inches. Shoulders 18 and 24 are formed to retain securely the sample tube within the casing. In such apparatus it has been found that the soil within cutting bit 22 can be adequately frozen in about five seconds; and such operation consumes about ¼ lb. of $CO_2$. The above-stated time duration varies with the amount of water in the soil, less time being necessary for soil having a high proportion of water therein.

Figure 3:
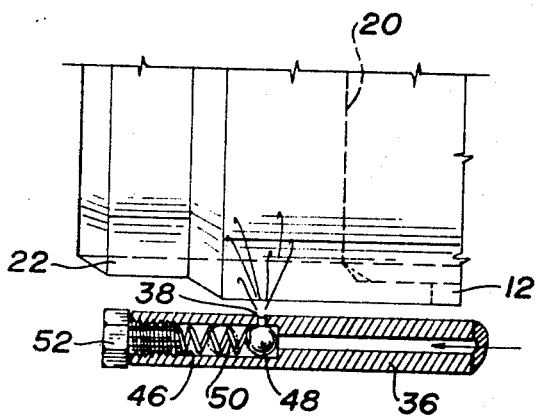
FIG. 3 is an enlarged detail view of a portion of FIG. 1.

To avoid restriction or clogging of jet opening 38 in conduit 36 it has been found efficient to provide a check valve for cooperation with the jet opening. As shown in FIG. 3, such check valve can be conveniently formed by boring a large diameter portion 46 in the lower end of conduit 36 and by placing in the bore a ball valve 48 which is biased upwardly to a closed position by a spring 50 retained in the bore by a closure screw 52. With the ball in a closed position, shown in solid lines in FIG. 3, mud is excluded from entry into the conduit through jet opening 38. When refrigerant fluid is applied to the conduit, however, ball 48 is forced downwardly, as shown by a broken line in the figure, so as to permit the refrigerant fluid to pass through jet opening 38 and effect the abovementioned freezing action.

Figure 4:
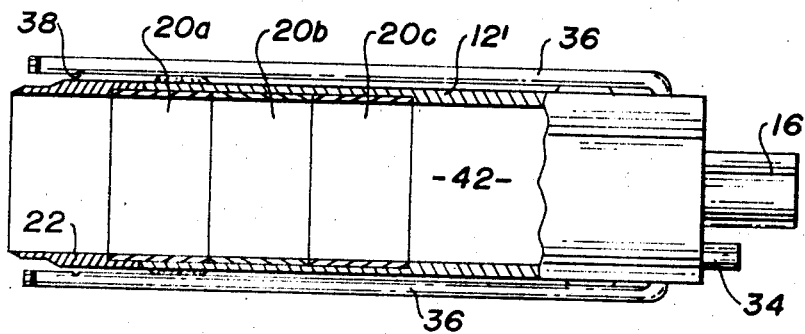
FIG. 4 is a side view in partial cross section of another form of soil sampler embodying my invention.
Figure 2:
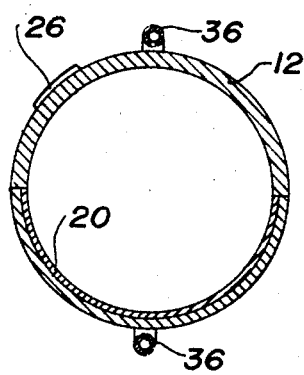
FIG. 2 is a cross-sectional view taken along line 2—2 of FIG. 1.

A modification of the present invention is shown in FIG. 4 wherein a casing 12' is adapted to receive a plurality of sample tubes 20a, 20b, 20c in axially aligned relationship. Casing 12' is substantially identical to casing 12 described hereinabove in connection with FIGS. 1–3, except that casing 12' is somewhat longer to accommodate plural sample tubes. The casing includes refrigerant fluid conduits 36, communication with which is established through a fluid inlet fitting 34. The conduits terminate in jet openings 38 adjacent cutting bit 22. The technique for placement of the embodiment of FIG. 4 into the soil is identical to that previously described. When the soil opposite jet openings 38 and adjacent sample tube 20a is frozen, the apparatus can be raised from the soil to provide plural undisturbed samples in sample tubes 20a, 20b, 20c. The embodiment of FIG. 4 is particularly useful in situations where a detailed cross-sectional plot of soil conditions is desired. Careful separation of each of the sample tubes from the others retain the sample in an undisturbed segregated condition, thereby enhancing accuracy of laboratory tests conducted on the sample.

Figure 5:
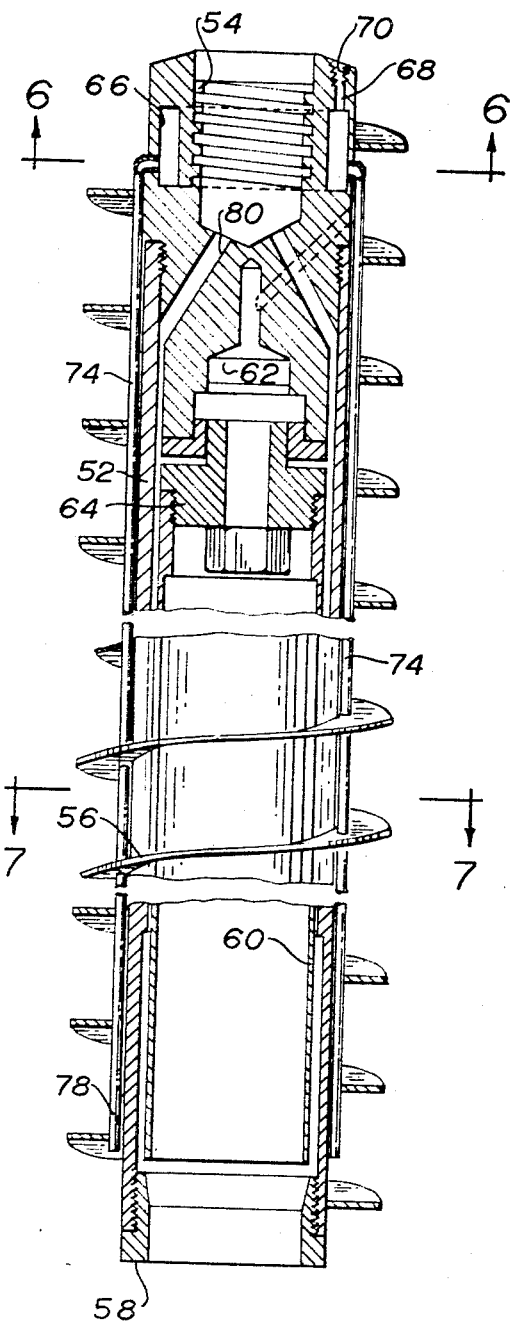
FIG. 5 is a side view in partial cross section of still another form of soil sampler embodying my invention.
Figure 6:
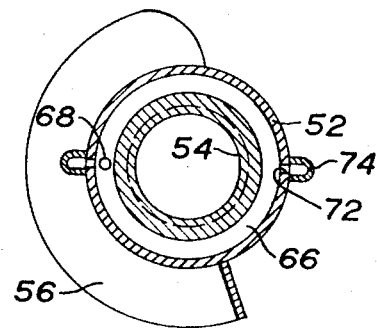
FIG. 6 is a cross-sectional view taken along line 6—6 of FIG. 5.
Figure 7:
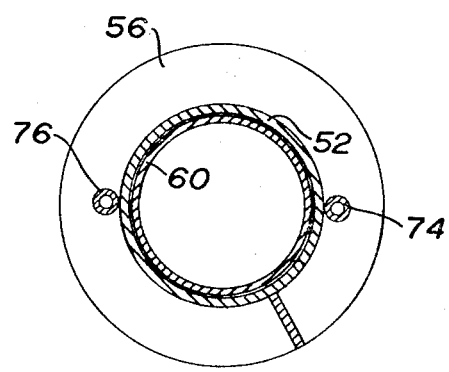
FIG. 7 is a cross-sectional view taken along line 7—7 of FIG. 5.

Referring now to FIGS. 5–7, there is shown a double tube core barrel sampler that is particularly suitable for retrieving core samples of substantial length. The apparatus includes an outer tube or casing 52 having at its upper end a threaded opening 54 for attachment of a conventional drill rod or the like. Casing 52 has a generally cylindric outer surface to which is secured, as by welding, a spiral flight plate 56 in auger-like form. The outer tube at its lower end is provided with a cutting bit 58 to enable the apparatus to be moved downwardly through soil in response to rotation of the apparatus through a drill rod engaged in connector 54.

An inner or sample tube 60 is mounted within casing 52 by a bearing connection 62 which mounts the inner tube for rotation relative to the outer tube. Such form of bearing connection is a well known expedient and permits the inner tube to embrace a soil sample in response to downward movement of the apparatus without rotating or disturbing the soil sample. A threaded connection 64 is provided between tube 60 and bearing connection 62 so that the inner tube can be removed from the outer tube in extracting the soil sample from the apparatus.

The outer tube 52 adjacent its upper end is formed with a manifold chamber 66, a longitudinally extending passage 68 terminating in a threaded opening 70 being provided to afford communication with the manifold chamber. The side wall of tube 52 is bored at 72 to establish fluid communication between the manifold chamber and pipes 74 which define refrigerant fluid conduits. As can be seen most clearly in FIG. 7, flight plate 56 is apertured at 76 adjacent the outer surface of tube 52; refrigerant fluid conduits 74 extend through the aperture terminating at the lower end of the apparatus in jet openings 78 opposite bit 58 and adjacent the lower end of inner sample tube 60. Installation of the conduits 74 through aperture 76 in flight plate 56 reinforces the conduits and prevents bending or other dislodgement of the conduits as the apparatus is rotated in the soil to move it downwardly.

In operation the embodiment of FIGS. 5–7 is mounted onto a drill rod by means of threaded opening 54 at the top of the apparatus. In response to rotative and downward force provided by the drilling equipment of conventional form the apparatus enters the soil surface. The abrasive surface of drilling bit 58 expedites downward movement of the apparatus. Flight plate 56 further expedites downward movement of the sampler as well as provided reinforcement for conduits 74. When the apparatus reaches a depth such that inner tube 60 embraces the desired sample, a refrigerant fluid is applied through fitting 70 to manifold chamber 66, the fluid passing downwardly through conduit 74 for egress through jet openings 78. The cooling resulting from expansion of the fluid as it issues through jets 78 freezes that portion of the sample adjacent cutting bit 58 and adjacent the lower end of sample tube 60 so that the apparatus can be withdrawn by reversing the direction of rotation of the drilling equipment. Irrespective of fluid or flowable characteristics of the soil sample, it will be retrieved successfully, and in an undisturbed condition, since the frozen material adjacent the lower end of sample tube 60 retains the sample within tube 60 against the force of gravity.

As is conventional in double tube core barrels of the type here under consideration, a water passage 80 is frequently provided for communicating water from a central bore in a drill rod engaged with threaded connected 54 and the annular space between outer tube 52 and inner tube 60. The presence of such water lubricates the two tubes with respect to one another in order to afford relative rotation. Should the soil sample be deficient in water, the water applied through channel 80 will be frozen when the fluid is applied through jet openings 58 and an undisturbed sample will consequently be retrieved. Such characteristic of the present invention is particularly useful in retrieving samples from soil having a large proportion of dry sand which, although such soil is dry, is extremely flowable and difficult to sample efficiently.

One structure designed in accordance with the embodiment of FIGS. 5–7 has a length of approximately six feet and an outer tube 52 having an outer diameter of approximately four inches. In such structure, flight plates 56 have a radial extent of approximately three inches. In operating such structure, a soil sample extending from the surface down to a depth of five feet is first retrieved and after inner tube 60 is replaced by another inner tube, a sample extending from a point five feet below the soil to a point ten feet below the soil can then be readily retrieved. In retrieving the last-mentioned sample, a flexible fluid line, not shown, is connected to threaded opening 70 and is temporarily lashed to the drill rod until the structure has attained the desired depth. When such depth is attained the flexible tube is unlashed from the drill rod and is connected to a bottle or tank of refrigerant fluid so as to freeze that portion of the sample adjacent drill bit 58 and adjacent the lower end of inner tube 60.

It will thus be seen that the present invention provides an apparatus and method for receiving substantially undisturbed samples from flowable soil such as soil of high water content. In addition to providing for extremely accurate samples, the present invention permits retrieval of the samples in a rapid, efficient and inexpensive manner.

What is claimed is:

1. In a core sampler comprising a hollow casing adapted to be driven into soil at a site from which a core sample is sought, said casing having an open lower end; means for affording attachment of said casing to a drill rod at an end thereof removed from said lower end; and a hollow sample tube mounted within said casing in communication with said open lower end, the improvement comprising: a fluid manifold chamber inwardly of said drill rod attaching means, means secured to said casing for conveying refrigerant fluid from said manifold chamber to a point adjacent said lower open end, and means adjacent said drill rod attaching means for defining a threaded opening for establishing communication with said manifold chamber.

2. A core sample retriever according to claim 1 wherein said refrigerant fluid conveying means comprises means defining a plurality of fluid conduits extending axially of said casing said conduits defining fluid jet openings adjacent the lower end of said tube, the opposite end of said conduits being connected to said manifold chamber to afford fluid communication with said conduits.

3. A core sampler according to claim 2 in combination with a check valve associated with each said jet opening, said check valve comprising a ball mounted in said conduit for movement between a closed position opposite said jet opening and an open position below said jet opening and means for resiliently biasing said ball toward said closed position.

4. A core sampler according to claim 1 wherein said casing has an enlarged diameter portion adjacent the lower end for receiving said sample tube therein, said large diameter portion terminating upwardly of the lower end in a shoulder for supporting said sample tube, and a cutting bit for mounting on the lower end of said casing, said cutting bit having an enlarged internal diameter portion on the upper end thereof terminating inwardly of said bit in a shoulder for supporting the lower end of said sample tube.

5. A core sampler comprising a hollow casing adapted to be driven into soil at a site from which a core sample is sought, said casing having an open lower end and means for affording attachment of said casing to a drill rod at an end thereof remote from said lower end, a hollow sample tube mounted within said casing in communication with said open lower end, a fluid manifold chamber inwardly of said drill rod attaching means, means adjacent said drill rod attaching means for defining a threaded opening for establishing communication with said manifold chamber, and means secured to said casing for conveying refrigerant fluid to a point adjacent said open end, said refrigerant conveying means extending from said manifold chamber to the lower end of said casing, said casing being formed to define a disturbed earth chamber intermediate the upper extremity of said sample tube and said manifold chamber, whereby when a soil sample was forced into said tube by downward force appled to said casing the sample is retained in said tube against the force of gravity by freezing a portion of the sample adjacent said lower end.

References Cited

UNITED STATES PATENTS

| 2,779,195 | 1/1957 | Simon | 73—421 |
| 2,812,160 | 11/1957 | West et al. | 175—17 |
| 2,905,444 | 9/1959 | Shepard | 175—17 |
| 2,915,285 | 12/1959 | Deily | 175—17 |
| 3,059,707 | 10/1962 | Frisby | 175—249 X |
| 3,229,914 | 1/1966 | Seavey | 239—453 X |

LOUIS R. PRINCE, *Primary Examiner.*

DANIEL M. YASICH, *Assistant Examiner.*

U.S. Cl. X.R.

73—421; 175—249, 394